United States Patent
Inomoto et al.

(10) Patent No.: US 10,734,873 B2
(45) Date of Patent: Aug. 4, 2020

(54) MOTOR

(71) Applicant: MITSUBISHI HEAVY INDUSTRIES, LTD., Tokyo (JP)

(72) Inventors: Makoto Inomoto, Tokyo (JP); Kodai Shimono, Tokyo (JP); Ryoji Okabe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 3 days.

(21) Appl. No.: 16/289,033

(22) Filed: Feb. 28, 2019

(65) Prior Publication Data

US 2019/0280575 A1    Sep. 12, 2019

(30) Foreign Application Priority Data

Mar. 8, 2018  (JP) .................. 2018-042414

(51) Int. Cl.
| | |
|---|---|
| *H02K 15/03* | (2006.01) |
| *H02K 5/02* | (2006.01) |
| *H02K 3/46* | (2006.01) |
| *H02K 1/28* | (2006.01) |
| *H02K 1/27* | (2006.01) |
| *H02K 15/02* | (2006.01) |
| *H02K 21/24* | (2006.01) |
| *H02K 16/00* | (2006.01) |
| *H02K 3/52* | (2006.01) |
| *C08J 5/04* | (2006.01) |

(52) U.S. Cl.
CPC .......... *H02K 15/03* (2013.01); *H02K 1/2793* (2013.01); *H02K 1/28* (2013.01); *H02K 3/46* (2013.01); *H02K 3/521* (2013.01); *H02K 5/02* (2013.01); *H02K 15/028* (2013.01); *H02K 16/00* (2013.01); *H02K 21/24* (2013.01); *C08J 5/042* (2013.01)

(58) Field of Classification Search
CPC .............. H02K 1/28; H02K 3/36; H02K 5/02
USPC ................. 310/154.33, 156.28, 156.35–37
See application file for complete search history.

(56) References Cited

U.S. PATENT DOCUMENTS

| | | | | |
|---|---|---|---|---|
| 4,371,801 | A | * | 2/1983 | Richter .................. H02K 21/24 310/156.36 |
| 5,440,185 | A | * | 8/1995 | Allwine, Jr. ............. G01B 7/30 310/114 |
| 2008/0024044 | A1 | * | 1/2008 | Palmer ..................... H02P 6/14 310/68 R |

(Continued)

*Primary Examiner* — Jose A Gonzalez Quinones
(74) *Attorney, Agent, or Firm* — Wenderoth, Lind & Ponack, L.L.P.

(57) ABSTRACT

A motor includes a rotation shaft, a magnet unit fixed to the rotation shaft to rotates with the rotation shaft, and a coil unit arranged to face the magnet unit in an axial direction. The magnet unit includes a magnet ring in which magnets are arranged in a circumferential direction of the rotation shaft, and a holding ring provided at an outer peripheral side of the magnet ring to hold the magnet ring. The holding ring includes a composite material in which a carbon fiber is impregnated with resin. The carbon fiber includes a pitch-based carbon fiber and a PAN-based carbon fiber. A volume ratio of the pitch-based carbon fiber is larger than that of the PAN-based carbon fiber in a portion at an outer peripheral side; a volume ratio of the PAN-based carbon fiber is larger than that of the pitch-based carbon fiber in a portion at an inner peripheral side.

8 Claims, 4 Drawing Sheets

(56) References Cited

U.S. PATENT DOCUMENTS

2008/0036330 A1\* 2/2008 Abe ................... H02K 21/44
                                                                                          310/268
2016/0329785 A1    11/2016 Kie et al.

\* cited by examiner

☐ PAN  ▨ PITCH

FIG.6

MOTOR

CROSS-REFERENCE TO RELATED APPLICATIONS

The present application claims priority to and incorporates by reference the entire contents of Japanese Patent Application No. 2018-042414 filed in Japan on March 8, 2018.

FIELD

The present invention relates to a motor.

BACKGROUND

Conventionally, a rotor of a motor in which a plurality of magnets are arranged on a rotor plate fitted to a shaft in the circumferential direction has been known (for example, see Patent Literature 1). This rotor plate is held by a rim formed outside a back plate extended from the shaft, and a restricting band provided outside the rim.

CITATION LIST

Patent Literature

Patent Literature 1: U.S. Patent Publication No. 2016/0329785

SUMMARY

Technical Problem

In the rotor disclosed in Patent Literature 1, a large centrifugal force is applied to the magnets while the rotor is rotating at high speed. Consequently, the rotor disclosed in Patent Literature 1 is provided with a restricting band to resist the centrifugal force applied to the magnets. In this example, the restricting band is made of a composite material. However, the hoop stress differs between the inner peripheral side and the outer peripheral side of the restricting band. More specifically, the hoop stress at the inner peripheral side of the restricting band is larger than that at the outer peripheral side. Thus, the restricting band may not be able to hold the magnets properly.

Consequently, an object of the present invention is to provide a motor capable of suitably rotating a magnet unit, while properly holding the magnet unit to which centrifugal force is applied.

Solution to Problem

A motor according to an aspect of the present invention includes a rotation shaft, a magnet unit fixed to the rotation shaft to rotates with the rotation shaft, and a coil unit arranged to face the magnet unit in an axial direction of the rotation shaft. The magnet unit includes a magnet ring in which a plurality of magnets are arranged in a circumferential direction of the rotation shaft, and a holding ring provided at an outer peripheral side of the magnet ring to hold the magnet ring. The holding ring includes a composite material in which a carbon fiber is impregnated with resin, the carbon fiber including a pitch-based carbon fiber and a PAN-based carbon fiber, such that a volume ratio of the pitch-based carbon fiber is larger than a volume ratio of the PAN-based carbon fiber in a portion at an outer peripheral side, and a volume ratio of the PAN-based carbon fiber is larger than a volume ratio of the pitch-based carbon fiber in a portion at an inner peripheral side.

With this configuration, the PAN-based carbon fibers that have high strength are disposed more in the portion at the inner peripheral side of the holding ring, and the pitch-based carbon fibers that have high elasticity are disposed more in the portion at the outer peripheral side of the holding ring. Thus, even when the hoop stress is large in the portion at the inner peripheral side of the holding ring, it is possible to resist the hoop stress by the high strength PAN-based carbon fibers. Moreover, it is possible to level the stress distribution of the hoop stress, by disposing the highly elastic pitch-based carbon fibers more at the outer peripheral side. Furthermore, even when an amount of deformation caused by the hoop stress is large in the portion at the outer peripheral side of the holding ring, it is possible to allow the deformation by the highly elastic pitch-based carbon fibers. Consequently, the holding ring can properly hold the magnet ring to which centrifugal force is applied. Thus, it is possible to suitably rotate the magnet unit.

It is preferable that the holding ring includes a pitch layer that is a portion at an outer peripheral side, and that is formed of the pitch-based carbon fiber, a PAN layer that is a portion at an inner peripheral side, and that is formed of the PAN-based carbon fiber, and a mixed layer that is a portion between the pitch layer and the PAN layer, and that serves as a layer including the pitch-based carbon fiber and the PAN-based carbon fiber.

With this configuration, it is possible to dispose the PAN-based carbon fibers and the pitch-based carbon fibers from the inner peripheral side to the outer peripheral side of the holding ring, flexibly changing the volume ratio of the PAN-based carbon fibers and the pitch-based carbon fibers. Consequently, it is possible to properly set the volume ratio of the PAN-based carbon fibers and the pitch-based carbon fibers, relative to the hoop stress applied to the holding ring.

It is preferable that the holding ring includes a plurality of layers that are disposed along a circumferential direction and that are laminated from the inner peripheral side to the outer peripheral side, each layer being formed of a fiber reinforced base material that has end portions between which a splice is formed, and the fiber reinforced base material is disposed such that the splice differs in phase in a circumferential direction from the splice of the fiber reinforced base material in the adjacent layer.

With this configuration, the splices of the end portions of the fiber reinforced base material will not be placed at the same position in the circumferential direction, in the circumferential direction of the holding ring. Consequently, it is possible to suppress a reduction in strength of the holding ring caused when the splices are overlapped with each other.

It is preferable that the magnet unit further includes a protection cover configured to cover the magnet ring and the holding ring, the protection cover including a composite material in which a pitch-based carbon fiber is impregnated with resin.

With this configuration, the magnet ring and the holding ring can be integrally held by the protection cover.

Moreover, it is possible to smooth the outer surface of the magnet unit by providing the protection cover. Consequently, it is possible to improve the aerodynamic characteristics of the magnet unit during rotation.

It is referable that the magnet unit further includes a foam material that is provided at the outer peripheral side of the holding ring, and that is provided at an inner peripheral side of the protection cover, the foam material having a shape with no bending portion for the protection cover.

With this configuration, by providing the foam material, a bending portion is not formed in the protection cover. Consequently, the protection cover can suitably cover the magnet ring, the holding ring, and the foam material.

It is preferable that the magnet unit further includes a support member that is provided at an inner peripheral side of the magnet ring, and that is provided between the magnet ring and the rotation shaft.

With this configuration, it is possible to properly position the center of the magnet ring and the center of the rotation shaft by the support member, and dispose the magnet unit on the rotation shaft. To reduce weight, for example, the support member may have a spoke structure using wires, a lattice structure, or a structure using a foam material.

It is preferable that the magnet ring includes a plurality of magnets arranged in the circumferential direction of the rotation shaft, and a magnet guide in which a plurality of housing holes for housing the magnets are formed, the magnet guide including a plurality of plates laminated in the axial direction of the rotation shaft.

With this configuration, even when a cutting process is difficult to perform on the magnet guide, it is possible to easily form the magnet guide by overlapping the metal plates with each other. For example, the plate is a nonmagnetic metal plate.

It is preferable that the motor further includes a casing that is provided at an outer peripheral side of the coil unit to house the rotation shaft, the magnet unit, and the coil unit therein, wherein the coil unit is provided with a fitting part for fixing the coil unit to the casing.

With this configuration, the coil unit can be fixed to the casing via the fitting part.

DESCRIPTION OF EMBODIMENTS

Hereinafter, an embodiment according to the present invention will be described in detail with reference to the accompanying drawings. It is to be understood that this invention is not limited to the embodiment. Moreover, components described in the following embodiment include components that can be easily replaced by those skilled in the art, and components that are substantially the same. Furthermore, the components described below can be combined with one another as appropriate. Still furthermore, when there are a plurality of embodiments, the embodiments may be combined with one another.

Embodiment

A motor I according to the present embodiment is a coreless motor in which an iron core is not provided in a coil. The motor 1 is a motor having a multi-stage coreless motor structure in which a plurality of single stages including a coil unit 13 serving as a stator and two magnet units 12 serving as rotors provided on both sides of the coil unit 13 are layered in an axial direction. The motor 1 is a high speed rotating motor in which the circumferential speed of the magnet units 12 serving as the rotors becomes high (for example, a value close to Mach 1) to achieve high output.

Figure 1:
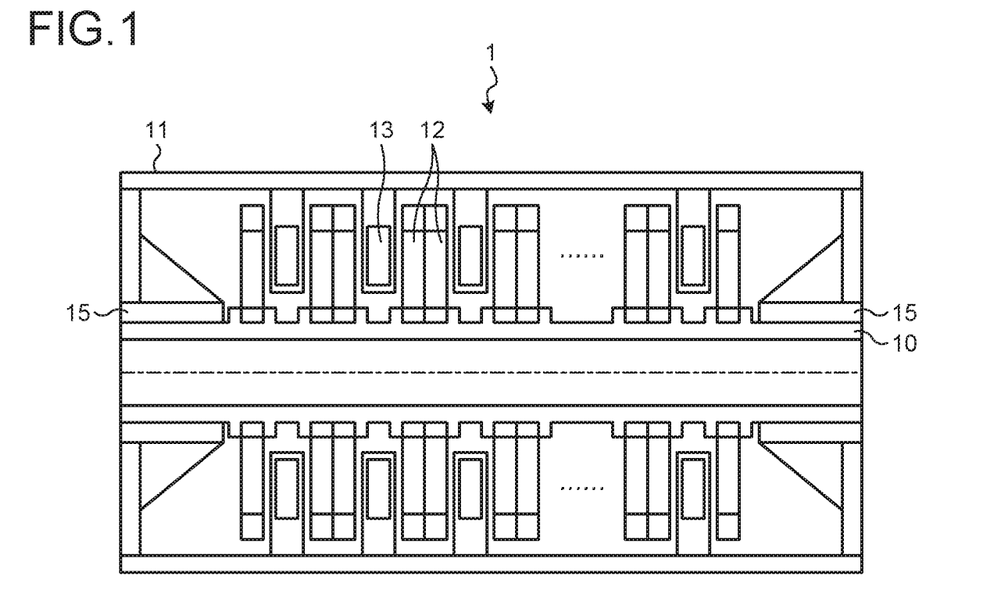
FIG. 1 is a schematic view schematically illustrating a motor according to the present embodiment.

FIG. 1 is a schematic view schematically illustrating a motor according to the present embodiment.

Figure 2:
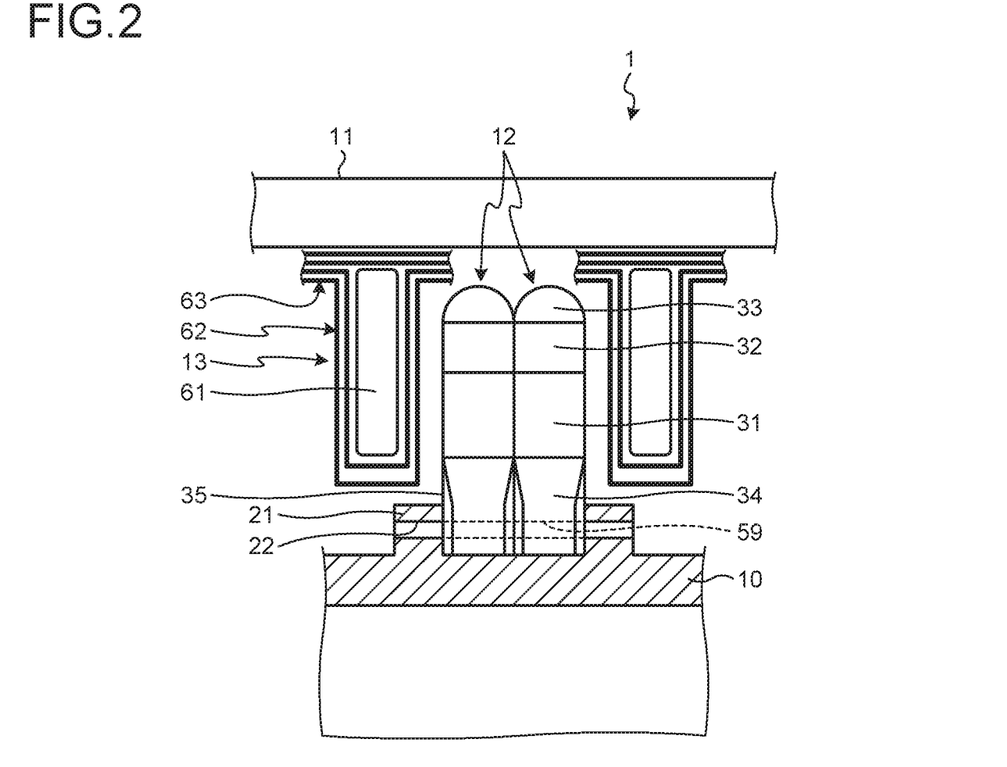
FIG. 2 a schematic view schematically illustrating a part of the motor according to the present embodiment.
Figure 3:
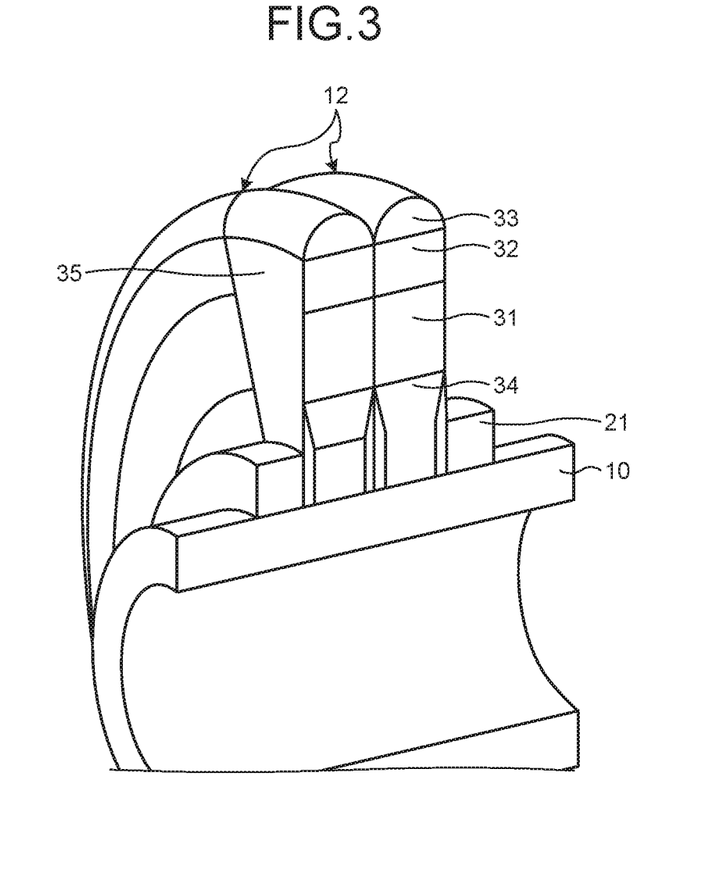
FIG. 3 a perspective view illustrating a cross-section of a magnet unit of the motor according to the present embodiment.
Figure 4:
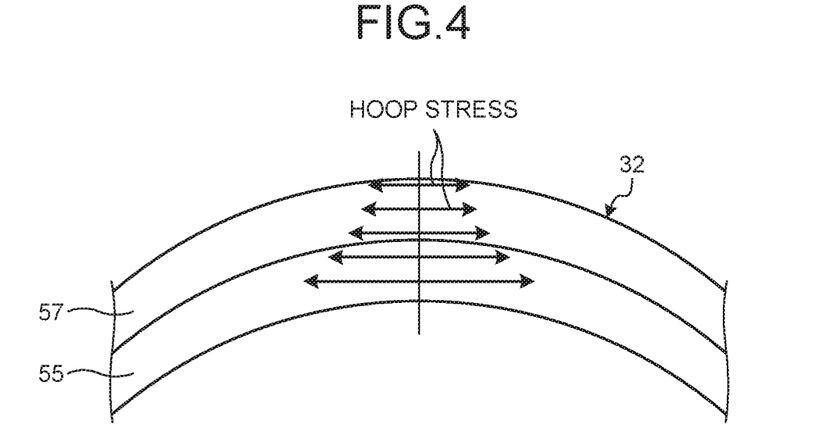
FIG. 4 is an explanatory diagram related to a hoop stress applied to a holding ring.
Figure 5:
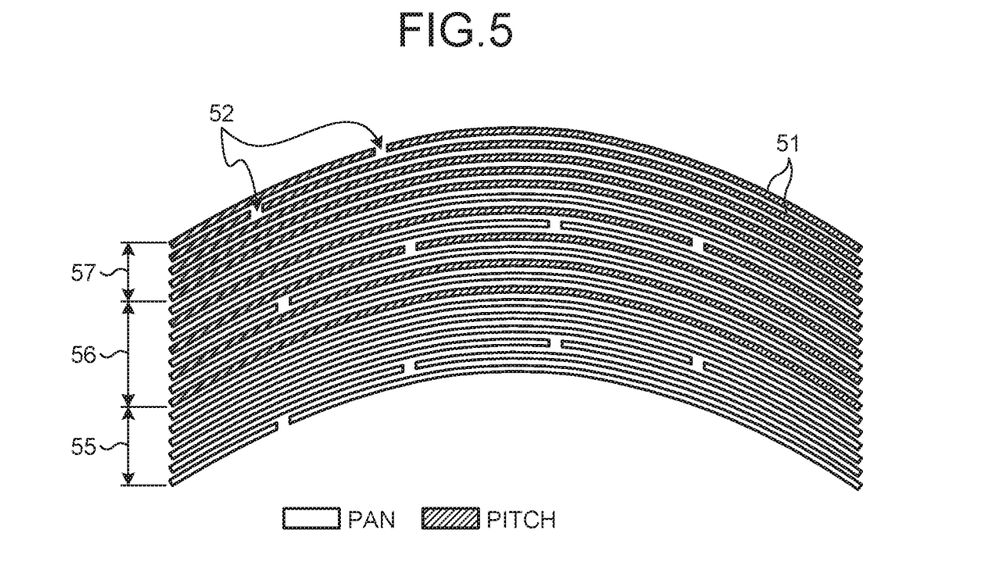
FIG. 5 is an explanatory diagram illustrating a laminated structure of the holding ring.
Figure 6:
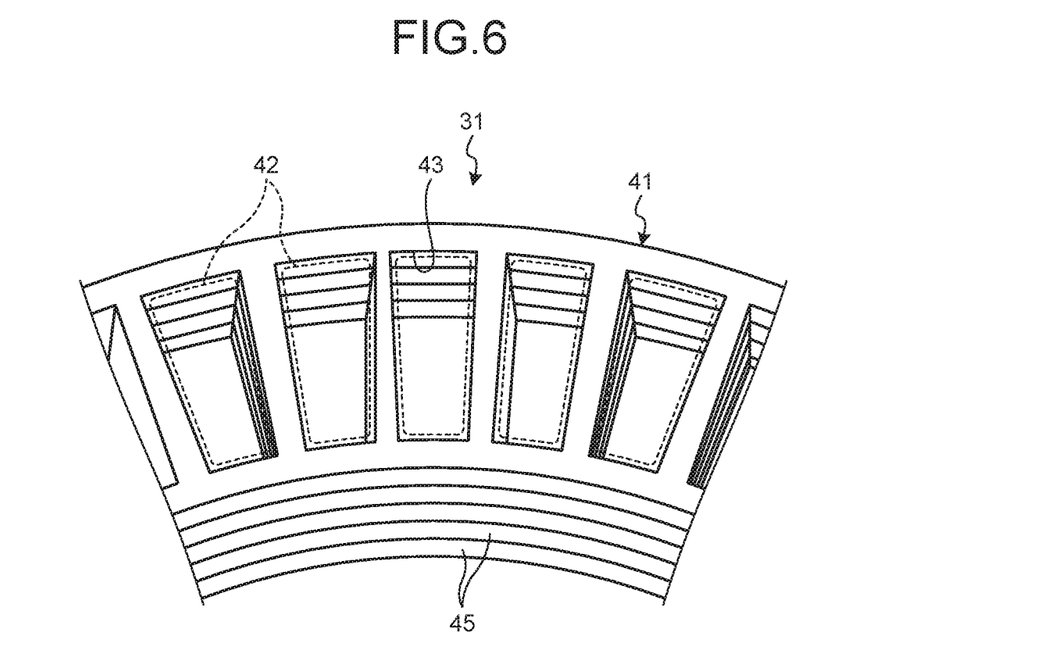
FIG. 6 is a perspective view schematically illustrating a magnet guide.
Figure 7:
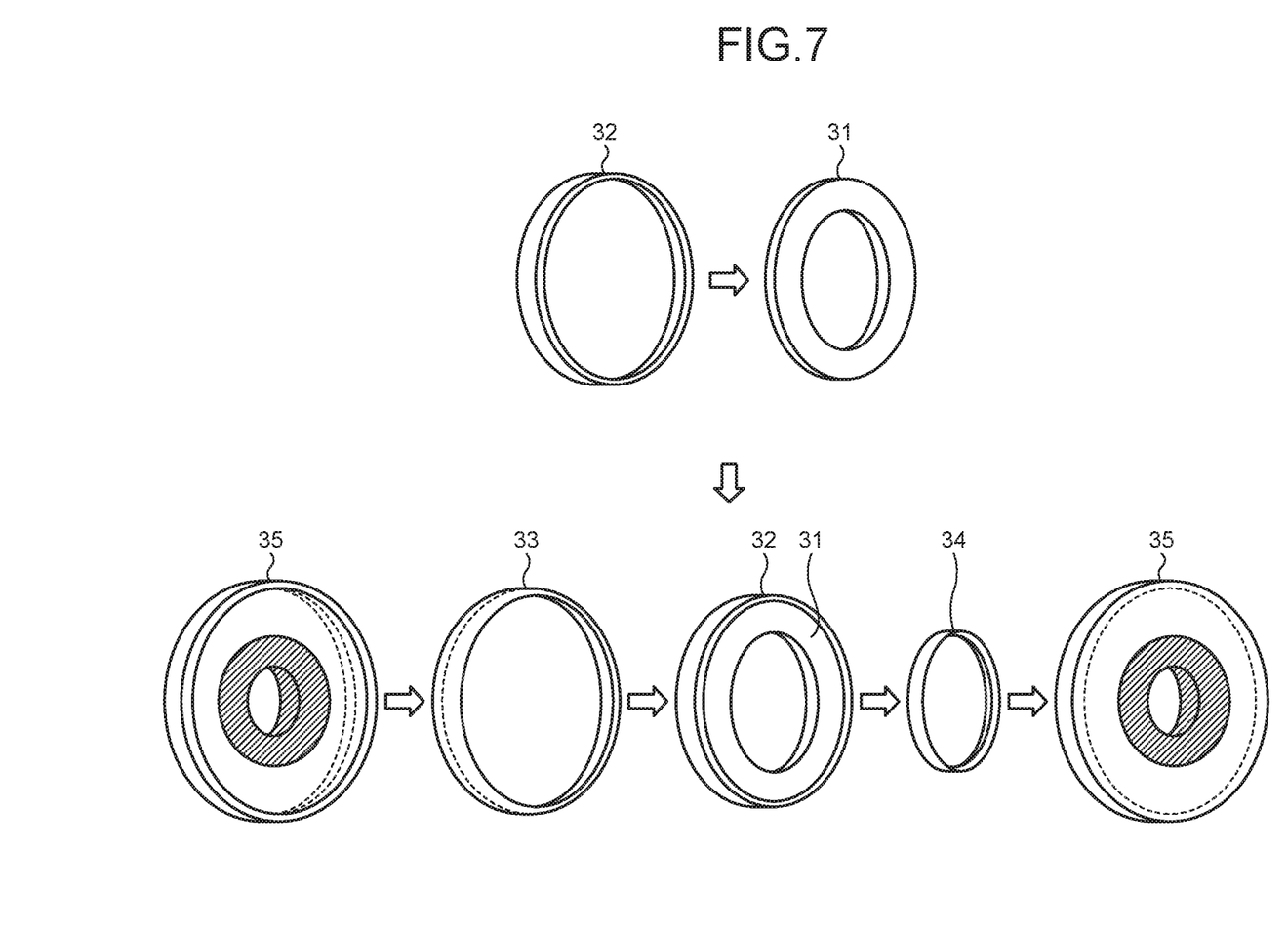
FIG. 7 is diagram for explaining how a magnet unit is formed.

FIG. 2 is a schematic view schematically illustrating a part of the motor according to the present embodiment. FIG. 3 is a perspective view illustrating a cross-section of a magnet unit of the motor according to the present embodiment. FIG. 4 is an explanatory diagram related to a hoop stress applied to a holding ring. FIG. 5 is an explanatory diagram illustrating a laminated structure of the holding ring. FIG. 6 is a perspective view schematically illustrating a magnet guide. FIG. 7 is a diagram for explaining how a magnet unit is formed.

As illustrated in FIG. 1, the motor 1 includes a rotation shaft 10, a casing 11, the magnet unit 12, the coil unit 13, and a bearing 15.

The rotation shaft 10 is formed in a cylindrical shape the center of which is hollowed. As illustrated in FIG. 2, the rotation shaft 10 includes a position restricting part 21 for fixing the magnet unit 12. The position restricting part 21 is provided so as to project from the outer periphery of the rotation shaft 10, and restricts the movement of the magnet unit 12 in the axial direction. As illustrated in FIG. 2, the position restricting part 21 is disposed on both sides of the two adjacent magnet units 12 in the axial direction. An interval between the two position restricting parts 21 in the axial direction is the length of the two magnet units 12 in the axial direction. Moreover, a fastening hole 22 that extends in the axial direction penetrates through each of the position restricting parts 21. When a fastening member, which is not illustrated, is inserted into the fastening hole 22 and is fastened to the magnet unit 12, the movement of the magnet unit 12 in the circumferential direction is restricted, and the magnet unit 12 is fixed to the rotation shaft 10. The rotation shaft 10 is rotatable in the circumferential direction with the magnet unit 12.

The casing 11 is provided so as to house the rotation shaft 10 therein, and to surround the outer peripheral side of the rotation shaft 10. The coil unit 13 is fitted inside the casing 11.

The bearing 15 is provided between the casing 11 and the rotation shaft 10, and is provided on both sides of the rotation shaft 10 in the axial direction. The two bearings 15 rotatably support the rotation shaft 10.

The magnet unit 12 is fixed to the rotation shaft 10, and a plurality of the magnet units 12 are arranged in the axial direction of the rotation shaft 10. As illustrated in FIG. 2, in the adjacent two-stage coreless motor structure, the magnet units 12 is disposed such that the two adjacent magnet units 12 are regarded as one set.

Because the magnet units 12 have the same configuration, in the following, a single magnet unit 12 will be described.

As illustrated in FIG. 2 and FIG. 3, the magnet unit 12 includes a support ring 34, a magnet ring 31, a holding ring 32, and a foam ring 33 in this order from the inner peripheral side. The support ring 34, the magnet ring 31, the holding ring 32, and the foam ring 33 are covered by a protection cover 35.

As illustrated in FIG. 6, the magnet ring 31 includes a plurality of magnets 42 arranged in the circumferential direction of the rotation shaft 10, and a magnet guide 41 that holds the magnets 42. Each of the magnets 42 is a permanent magnet, and the magnet 42 is formed in a substantially fan shape in which the length of the inner peripheral side is short, and the length of the outer peripheral side is long. The magnetic pole of one side of the magnet 42 in the axial direction is one of the positive and negative poles. The magnetic pole of the other side of the magnet 42 in the axial direction is the other of the positive and negative poles. The magnet guide 41 is a non-magnetic member formed in a ring shape. In the magnet guide 41, a plurality of housing holes 43 for housing the magnets 42 are arranged in the circumferential direction. Each of the housing holes 43 has a complementary shape with the magnet 42, and is formed in a substantially fan shape in which the length of the inner peripheral side is short, and the length of the outer peripheral side is long. The magnet guide 41 is formed by laminating a plurality of metal plates 45. In the metal plates 45, a punching process is performed on a portion corresponding to the housing hole 43 for housing the magnet 42 using a punch and the like. The magnet guide 41 is formed by laminating the metal plates 45 to which the punching process is performed in the plate thickness direction.

As illustrated in FIG. 2 and FIG. 3, the holding ring 32 is provided at the outer peripheral side of the magnet ring 31, and is holding the magnet ring 31. The holding ring 32 is formed of a composite material including carbon fibers having pitch-based carbon fibers and polyacrylonitrile (PAN)-based carbon fibers, and the carbon fibers are impregnated with resin. In the carbon fibers included in the holding ring 32, the volume ratio of the carbon fibers the fiber direction of which is the circumferential direction is the highest, and for example, equal to or more than 50 percent. The holding ring 32 is formed by a method such as a filament winding in which carbon fibers are formed into a filament, and the holding ring 32 is formed using the filament; or a sheet winding in which carbon fibers are formed into a sheet, and the holding ring 32 is formed using the sheet.

In this example, as illustrated in FIG. 4, a hoop stress is applied to the holding ring 32 by a centrifugal force that is applied when the magnet unit 12 is rotated. The hoop stress applied to the holding ring 32 is large at the inner peripheral side of the holding ring 32, and is reduced toward the outer peripheral side of the holding ring 32. To level the hoop stress, in the holding ring 32, the volume ratio of the pitch-based carbon fibers is increased in a portion at the outer peripheral side, and the volume ratio of the PAN-based carbon fibers is increased in a portion at the inner peripheral side. In this example, the pitch-based carbon fibers are carbon fibers that have higher elasticity than the PAN-based carbon fibers, and the PAN-based carbon fibers are carbon fibers that have higher strength than the pitch-based carbon fibers.

More specifically, the holding ring 32 has a two-stage structure in which the holding ring 32 is divided into two stages in the radial direction as illustrated in FIG. 4, or has a three-stage structure in which the holding ring 32 is divided into three stages in the radial direction as illustrated in FIG. 5. The structure of the holding ring 32 illustrated in FIG. 4 and FIG. 5 is merely an example, and is not particularly limited. The holding ring 32 may also have a multi-stage structure, or may have a structure in which the volume ratio of the pitch-based carbon fibers and the PAN-based carbon fibers is continuously changed in the radial direction. In other words, the holding ring 32 may have any structure, as long as the volume ratio of the pitch-based carbon fibers is increased in the portion at the outer peripheral side, and the volume ratio of the PAN-based carbon fibers is increased in the portion at the inner peripheral side.

The holding ring 32 illustrated in FIG. 4 includes a PAN layer 55 that is a portion at the inner peripheral side, and a pitch layer 57 that is a portion at the outer peripheral side and that is provided at the outer peripheral side of the PAN layer 55. All the carbon fibers used in the PAN layer 55 are the PAN-based carbon fibers. Moreover, all the carbon fibers used in the pitch layer 57 are the pitch-based carbon fibers. The layer thickness of the PAN layer 55 and the pitch layer 57 is substantially the same. However, the layer thickness of the PAN layer 55 and the pitch layer 57 may differ according to the required performance.

The holding ring 32 illustrated in FIG. 5 includes the PAN layer 55 that is the portion at the inner peripheral side, the pitch layer 57 that is the portion at the outer peripheral side, and a mixed layer 56 that is a portion between the PAN layer 55 and the pitch layer 57. Because the PAN layer 55 and the pitch layer 57 are the same as those in FIG. 4, the descriptions thereof will be omitted. In the mixed layer 56, the carbon fibers to be used include the PAN-based carbon fibers and the pitch based carbon fibers. For example, the ratio of the PAN-based carbon fibers and the pitch-based carbon fibers in the mixed layer 56 is 50 percent each.

Next, with reference to FIG. 5, a laminated structure according to the carbon fibers of the holding ring 32 will be described. In FIG. 5, the holding ring 32 is formed by what is called a sheet winding method with which a sheet-like carbon fiber sheet (fiber reinforced base material) 51 is laminated. The carbon fiber sheet 51 used in FIG. 5 is what is called a prepreg in which carbon fibers are impregnated with resin. However, the structure of the carbon fiber sheet 51 is not limited thereto.

Alternatively, a dry carbon fiber sheet or a dry filament not impregnated with resin may be used, and may be impregnated with resin in the succeeding process.

In the holding ring 32 illustrated in FIG. 5, a single-layer laminated structure is formed by winding a single carbon fiber sheet 51 in the circumferential direction. By laminating a plurality of the single-layer structures in the radial direction, laminated bodies of the PAN layer 55, the mixed layer 56, and the pitch layer 57 are formed. In this example, a splice 52 that will be a gap is formed between the end portions of the single carbon fiber sheets 51 wounded in the circumferential direction. In other words, because the single splice 52 is formed for a single-layer laminated structure, a plurality of the splices 52 are formed when a plurality of the single-layer laminated structures are laminated. When the splices 52 are continuously provided in the radial direction, the strength of the holding ring 32 in the radial direction will be reduced. Thus, the splices 52 formed in the holding ring 32 are disposed so that the phases differ from each other in the circumferential direction. In other words, the splices 52 are arranged at predetermined intervals in the circumferential direction. For example, the interval between the splices 52 in the circumferential direction is equal to or more than 25 mm.

The foam ring 33 is provided at the outer peripheral side of the holding ring 32. The foam ring 33 is a member that makes the outer shape of the magnet unit 12 into a shape easily covered by the protection cover 35, which will be described below. To reduce weight, the foam ring 33 is made of a foam material. For example, the foam material includes a metal foam material (or a porous material) that has a high conductivity and that is a nonmagnetic material, a resin foam material containing a fibrous material to increase the conductivity, or the like. The cross-section of the foam ring 33 cut along a surface orthogonal to the circumferential direction is formed into a semi-circular shape or a semi-elliptical shape. In other words, the surface at the inner peripheral side of the foam ring 33 is a surface having a complementary shape with the outer peripheral surface of the holding ring 32. The surface at the outer peripheral side of the foam ring 33 is an arc-shaped surface projected toward the outer peripheral side. By forming the shape of the foam ring 33 in this manner, a bending portion is not formed (no bending portion) in the protection cover 35.

The support ring 34 is provided at the inner peripheral side of the magnet ring 31, and is provided between the magnet ring 31 and the rotation shaft 10. The support ring 34 supports the magnet ring 31 on the rotation shaft 10 such that the axis center of the magnet ring 31 and the axis center of the rotation shaft 10 are overlapped with each other. To reduce weight, the foam material similar to that of the foam ring 33 is used for the support ring 34. Although the foam material is used for the support ring 34, the structure of the support ring 34 is not limited thereto. The support ring 34 may have any structure as long as the weight of the support ring 34 can be reduced. For example, the support ring 34 may have a spoke structure using wires, a lattice structure, or the like. A fastening hole 59 is provided in the support ring 34. The fastening hole 59 penetrates through the support ring 34 so as to overlap with the fastening hole 22 formed in the position restricting part 21 of the rotation shaft 10 in the axial direction. When a fastening member, which is not illustrated, is inserted into and fastened to the fastening hole 22 of the position restricting part 21 and the fastening hole 59 of the support ring 34, the magnet unit 12 is fixed to the rotation shaft 10.

The protection cover 35 covers the magnet ring 31, the holding ring 32, the foam ring 33, and the support ring 34. By holding the magnet ring 31, the holding ring 32, the foam ring 33, and the support ring 34 in the axial direction, the rings are integrally formed. In FIG. 3, only a part of the protection cover 35 is illustrated. The protection cover 35 is formed of a composite material including the pitch-based carbon fibers. The pitch-based carbon fibers are carbon fibers the thermal conductivity of which is higher than that of the PAN-based carbon fibers. Consequently, the protection cover 35 promotes the heat generated in the magnet unit 12 to be released to the outside, suppresses the temperature of the magnet unit 12 from increasing, and suppresses the performance of the magnet 42 from reducing. Moreover, the outer surface of the protection cover 35 is formed so as to be a smooth surface. Consequently, it is possible to improve the aerodynamic characteristics of the magnet unit 12 during rotation. The protection cover 35 covers the rings by integrating the rings that are divided at the center in the axial direction, in an overlapping manner in the axial direction.

The coil unit 13 is fixed to the casing 11, and a plurality of the coil units 13 are arranged in the axial direction of the rotation shaft 10. For a single-stage coreless motor structure, a single coil unit 13 is provided between the two magnet units 12. In FIG. 2, the coil unit 13 is disposed on both sides of the two adjacent magnet units 12. Because the coil units 13 have the same configuration, in the following, a single coil unit 13 will be described.

As illustrated in FIG. 2, the coil unit 13 includes a coil 61, a covering part 62 that covers the coil 61, and a flange part (fitting part) 63 that fits the coil unit 13 to the casing 11. For example, the coil 61 is filled with resin, and integrally formed with resin. The coil 61 generates a magnetic field when current is applied. The covering part 62 covers around the coil 61, and is continuously formed with the flange part 63. The flange part 63 is provided at the casing 11 side of the coil 61, in other words, at the outer peripheral side of the rotation shaft 10. The flange part 63 projects from both sides of the coil 61 in the axial direction. A fastening hole, which is not illustrated, is provided in the flange part 63, and when a fastening member is inserted into the fastening hole and is fastened to the casing 11, the coil unit 13 is fixed to the casing 11.

In this example, the covering part 62 and the flange part 63 are integrally formed of a composite material. To insulate the coil 61 from the casing 11, glass fiber reinforced plastic (GFRP) in which glass fibers impregnated with resin is used as the composite material.

Next, with reference to FIG. 7, a series of processes related to integral molding of the magnet unit 12 will be described. First, the magnet ring 31 and the holding ring 32 are integrally bonded by an adhesive. Because the magnet ring 31 is made of metal, the magnet ring 31 is temporarily cooled and shrunk. The magnet ring 31 and the holding ring 32 are fitted to each other by applying an adhesive between the outer peripheral surface of the shrunk magnet ring 31 and the inner peripheral surface of the holding ring 32. The magnet ring 31 is then heated, and when the magnet ring 31 expanded, the magnet ring 31 and the holding ring 32 are integrally formed.

As described above, in the first embodiment, the PAN-based carbon fibers that have high strength are disposed more in the portion at the inner peripheral side of the holding ring 32, and the pitch-based carbon fibers that have high elasticity are disposed more in the portion at the outer peripheral side of the holding ring 32. Thus, even when the hoop stress is high in the portion at the inner peripheral side of the holding ring 32, it is possible to resist the hoop stress by the high strength PAN-based carbon fibers. Moreover, it is possible to level the stress distribution of the hoop stress, by disposing the highly elastic pitch-based carbon fibers more at the outer peripheral side. Furthermore, even when an amount of deformation due to the hoop stress is large in the portion at the outer peripheral side of the holding ring 32, it is possible to allow the deformation by the highly elastic pitch-based carbon fibers. Consequently, the holding ring 32 can properly hold the magnet ring 31 to which centrifugal force is applied. Thus, it is possible to suitably rotate the magnet unit 12.

Moreover, in the first embodiment, as illustrated in FIG. 5, the mixed layer 56 is provided between the PAN layer 55 and the pitch layer 57. Thus, it is possible to dispose the PAN-based carbon fibers and the pitch-based carbon fibers from the inner peripheral side to the outer peripheral side of the holding ring 32, while flexibly changing the ratio of the PAN-based carbon fibers and the pitch-based carbon fibers. Consequently, it is possible to properly set the ratio of the PAN-based carbon fibers and the pitch-based carbon fibers, relative to the hoop stress applied to the holding ring 32.

Furthermore, in the first embodiment, the splices 52 formed in the holding ring 32 will not be placed at the same position in the circumferential direction, in other words, will not be overlapped with each other in the radial direction. Consequently, it is possible to suppress a reduction in strength of the holding ring 32 caused when the splices 52 are overlapped with each other.

Still furthermore, in the first embodiment, by providing the protection cover 35, it is possible to integrally hold the rings including the magnet ring 31 and the holding ring 32. Still furthermore, by providing the protection cover 35, it is possible to smooth the outer surface of the magnet unit 12. Consequently, it is possible to improve the aerodynamic characteristics of the magnet unit 12 during rotation.

Still furthermore, in the first embodiment, by providing the foam ring 33, a bending portion is not formed in the protection cover 35. Consequently, the protection cover 35 can suitably cover the magnet ring 31, the holding ring 32, and the foam ring 33.

Still furthermore, in the first embodiment, the support ring 34 is provided. Thus, it is possible to properly position the center of the magnet ring 31 and the center of the rotation shaft 10, and dispose the magnet unit 12 on the rotation shaft 10.

Still furthermore, in the first embodiment, the magnet guide 41 is formed by laminating the metal plates 45. Thus, even when a cutting process is difficult to perform on the magnet guide 41, it is possible to easily form the magnet guide 41 by overlapping the metal plates 45 with each other.

Still furthermore, in the first embodiment, the flange part 63 is provided to the coil unit 13.
Consequently, it is possible to properly fix the coil unit 13 to the casing 11 via the flange part 63.

In the present embodiment, the holding ring 32 is formed by the sheet winding method. When the holding ring 32 in FIG. 4 is formed by the filament winding method, the PAN layer 55 may be solidified after forming the PAN layer 55 by winding a filament, and the pitch layer 57 may then be solidified after forming the pitch layer 57 by winding the filament again. In other words, when the filament winding method is used, the holding ring 32 may be formed by partially solidifying each of the layers.

REFERENCE SIGNS LIST

1 Motor
10 Rotation shaft
11 Casing
12 Magnet unit
13 Coil unit
15 Bearing
21 Position restricting part.
22 Fastening hole of the position restricting part
31 Magnet ring
32 Holding ring
33 Foam ring
34 Support ring
35 Protection cover
41 Magnet guide
42 Magnet
43 Housing hole
45 Metal plate
51 Carbon fiber sheet
52 Splice
55 PAN layer
56 Mixed layer
57 Pitch layer
59 Fastening hole of the support ring
61 Coil
62 Covering part
63 Flange part

The invention claimed is:

1. A motor, comprising:
a rotation shaft;
a magnet unit fixed to the rotation shaft to rotates with the rotation shaft; and
a coil unit arranged to face the magnet unit in an axial direction of the rotation shaft, wherein
the magnet unit includes
  a magnet ring in which a plurality of magnets are arranged in a circumferential direction of the rotation shaft, and
a holding ring provided at an outer peripheral side of the magnet ring to hold the magnet ring, and
the holding ring includes a composite material in which a carbon fiber is impregnated with resin, the carbon fiber including a pitch-based carbon fiber and a PAN-based carbon fiber, such that a volume ratio of the pitch-based carbon fiber is larger than a volume ratio of the PAN-based carbon fiber in a portion at an outer peripheral side, and a volume ratio of the PAN-based carbon fiber is larger than a volume ratio of the pitch-based carbon fiber in a portion at an inner peripheral side.

2. The motor according to claim 1, wherein
the holding ring includes
  a pitch layer that is a portion at an outer peripheral side, and that is formed of the pitch-based carbon fiber,
  a PAN layer that is a portion at an inner peripheral side, and that is formed of the PAN-based carbon fiber, and
  a mixed layer that is a portion between the pitch layer and the PAN layer, and that serves as a layer including the pitch-based carbon fiber and the PAN-based carbon fiber.

3. The motor according to claim 1, wherein
the holding ring includes a plurality of layers that are disposed along a circumferential direction and that are laminated from the inner peripheral side to the outer peripheral side, each layer being formed of a fiber reinforced base material that has end portions between which a splice is formed, and
the fiber reinforced base material is disposed such that the splice differs in phase in a circumferential direction from the splice of the fiber reinforced base material in the adjacent layer.

4. The motor according to claim. 1, wherein the magnet unit further includes a protection cover configured to cover the magnet ring and the holding ring, the protection cover including a composite material in which a pitch-based carbon fiber is impregnated with resin.

5. The motor according to claim. 4, wherein the magnet unit further includes a foam material that is provided at the outer peripheral side of the holding ring, and that is provided at an inner peripheral side of the protection cover, the foam material having a shape with no bending portion for the protection cover.

6. The motor according to claim. 1, wherein the magnet unit further includes a support member that is provided at an inner peripheral side of the magnet ring, and that is provided between the magnet ring and the rotation shaft.

7. The motor according to claim 1, wherein
the magnet ring includes
  a plurality of magnets arranged in the circumferential direction of the rotation shaft, and
  a magnet guide in which a plurality of housing holes for housing the magnets are formed, the magnet guide including a plurality of plates laminated in the axial direction of the rotation shaft.

8. The motor according to claim 1, further comprising a casing that is provided at an outer peripheral side of the coil unit to house the rotation shaft, the magnet unit, and the coil unit therein, wherein the coil unit is provided with a fitting part for fixing the coil unit to the casing.

* * * * *